United States Defensive Publication [19] (H) [11] T996,002

Kwok [43] Jul. 1, 1980

[54] RECORDING MATERIALS

[75] Inventor: John C. Kwok, Sarnia, Canada

[73] Assignee: Bexford Limited, London, England

[21] Appl. No.: 87,566

[22] Filed: Oct. 23, 1979

[30] Foreign Application Priority Data

Jun. 26, 1978 [GB] United Kingdom ..... 27843/78

[51] Int. Cl.[3] ..... G03C 1/54; G03C 5/00; G03C 1/78

[52] U.S. Cl. ..... 430/152; 430/176; 430/177; 430/290; 430/633; 430/636; 430/637; 430/638

[57] ABSTRACT

Vesicular recording materials are described which include a sensitized layer comprising a polyeric vehicle for the sensitizing agent which is an acrylonitrile/substituted or unsubstituted styrene copolymer with at least 55 mole % of acrylonitrile and preferably less than 85 mole %. The copolymer is usually homogeneous and preferably derived from acrylonitrile and the styrene comonomer along and most preferably contains from 65 to 82 mole % of acrylonitrile. The copolymer is softenable on heating to permit the gas released by the sensitizing agent in the light struck areas to form light-scattering or reflecting vesicles therein.

A surfactant in an amount of at least 1% by weight, based on the weight of the copolymer, is essential to vesiculation and anionic surfactants are especially effective in providing a wide tonal range and good speed rating, amounts up to 20% by weight being preferred. Generally, amounts of the surfactant in the range 2 to 5% by weight provide a satisfactory combination of vasiculating properties. The sensitized layer is preferably applied as a coating to a carrier sheet support such as a polythylene terephthalate film. These recording materials have excellent vesiculating properties, particularly tonal range and speed rating.

9 Claims, No Sheets Drawing,

28 Pages Specification

The file of this unexamined application may be inspected and copies thereof may be purchased (849 O.G. 1221, Apr. 9, 1968).